United States Patent
Grange (10) Patent No.: US 8,726,738 B2
(45) Date of Patent: May 20, 2014

(54) STRESS SENSOR AND ITS MANUFACTURING METHOD

(75) Inventor: Hubert Grange, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 210 days.

(21) Appl. No.: 13/259,211

(22) PCT Filed: Apr. 22, 2010

(86) PCT No.: PCT/EP2010/055384
§ 371 (c)(1),
(2), (4) Date: Sep. 23, 2011

(87) PCT Pub. No.: WO2010/124993
PCT Pub. Date: Nov. 4, 2010

(65) Prior Publication Data
US 2012/0011938 A1 Jan. 19, 2012

(30) Foreign Application Priority Data
Apr. 27, 2009 (FR) ...................... 09 52749

(51) Int. Cl.
*G01N 3/20* (2006.01)
(52) U.S. Cl.
USPC .............................. 73/849; 73/841
(58) Field of Classification Search
USPC .......................... 73/760, 841, 849
See application file for complete search history.

(56) References Cited

U.S. PATENT DOCUMENTS

| | | | |
|---|---|---|---|
| 5,508,676 A * | 4/1996 | Grange et al. .................... 338/2 |
| 6,148,662 A | 11/2000 | Lin | |
| 7,243,558 B2 * | 7/2007 | Tellenbach et al. ...... 73/862.625 |
| 2006/0216848 A1 | 9/2006 | Tanie et al. | |
| 2007/0151356 A1 | 7/2007 | Sumigawa et al. | |
| 2007/0240519 A1 | 10/2007 | Shimazu et al. | |
| 2008/0223152 A1 | 9/2008 | Georgeson et al. | |
| 2009/0199650 A1 | 8/2009 | Shimazu et al. | |
| 2010/0036287 A1 * | 2/2010 | Weber ............................ 600/595 |
| 2010/0043541 A1 * | 2/2010 | Kobayakawa .................. 73/146 |

FOREIGN PATENT DOCUMENTS

WO  2008 059838  5/2008

OTHER PUBLICATIONS

International Search Report Issued Jun. 4, 2010 in PCT/EP10/55384 Filed Mar. 22, 2010.

* cited by examiner

*Primary Examiner* — Max Noori
(74) *Attorney, Agent, or Firm* — Oblon, Spivak, McClelland, Maier & Neustadt, L.L.P.

(57) ABSTRACT

A device for measuring deformation including: a) at least one strain gauge, producing a signal following a deformation, positioned on a face of a flexible support favoring elongation of the strain gauge, the face opposite the strain gauge of the flexible support, which is configured to be brought into contact with, or glued to, a test body with the deformation desired to be measured; b) at least one first substrate, including at least signal processor and/or signal transmission device; c) a securing mechanism to assemble the strain gauge and the first substrate mechanically, including an elastic layer of material having elastic properties positioned between the gauge and the first substrate, the elastic layer preventing deformation of the gauge from being transmitted, or be transmitted as little as possible, to the first substrate.

17 Claims, 8 Drawing Sheets

STRESS SENSOR AND ITS MANUFACTURING METHOD

TECHNICAL FIELD AND STATE OF THE PRIOR ART

The invention concerns the field of measurement of deformations of structures and more specifically the manufacture of measuring devices manufactured by batch manufacturing technologies used for microelectronics and enabling a large number of components to be manufactured on a single substrate, made for example from silicon.

There are many applications of these sensors: measurements of deformations at several points of a surface, of the type of an aircraft wing or of sail of a boat, which require a large number of measuring points (as many as 2,000 points in the case of an aircraft wing) or measurements of weights with gauges attached on to specific test bodies, for example balances.

Stress measurements in mechanical structures are generally made by attaching metal gauges to the areas where it is desired to make the measurements. Balances also use strain gauges glued on to test bodies at 4 points. This enables measuring accuracy to be improved by allowing assembly using a Wheatstone bridge with 2 opposite gauges measuring traction and 2 gauges measuring compression. An example of a strain gauge on a flexible support and a sensor fitted with this gauge is described in application WO94/02815.

Such a metal gauge may consist of laminated or drawn metal wires glued on to a plastic film (for example one made from polyimide 25 to 50 μm thick) or plated in a thin layer by cathodic spraying on a plastic film 25 μm thick, forming a metal track and soldering pins which will allow the electrical contacts to be reconnected. The metal gauge is then engraved chemically after an operation to coat it with resin, and to expose it according to the desired geometry, followed by development which defines the engraved and non-engraved parts.

The gauges glued on to test bodies are connected electrically to means of transmission of the signals detected by each gauge, for subsequent processing. This is accomplished using electrical wires soldered to the gauges' contact pins. The soldering of wires connecting the components poses no problems in the case of measurements where a limited number of sensors are used due to the small number of wires. Nor is there any restriction to the number of wires when there are no problems of available space for the passage of the wires or for their soldering.

A metal gauge, attached to a test body, traversed by an electrical current circulating in the metal track, is deformed in a manner matching the deformation of the test body, when a stress is applied to the test body. The metal track, according to the imposed deformation, is then subject proportionally to a variation of its resistance.

If the material and the shape of the test body and also the way in which the resistance varies are known it is possible to determine by calculation the initial deformation of the test body and the stress in the test body.

These gauges can be used to measure deformations at a number of predetermined points, which will enable the stresses exerted on the entire structure to be determined: this type of measurement is found for the analysis of stresses on an aircraft wing, or on a concrete structure such as a bridge, or on a dam or again on other structures. These measurements require the use of a very large number of gauges assembled individually or as Wheatstone bridges, and they therefore require a large number of wires which must be soldered to the gauges and connected to the measuring devices. In particular, the number of 2,000 gauges is commonly cited for stress measurements on an aircraft wing.

In addition, it is difficult or impossible to attach wires in a number of cases:
- in the case of gauges with long outputs or when it is impossible to have, above the point where the gauge is to be positioned, sufficient space to accomplish the soldering and the wiring: for example in the case of a stack of plates of an electric motor, or in the case of a transformer, or where gauges must be positioned through narrow slits,
- when a large number of gauges must be used, for example to measure a stress gradient,
- when measuring on edges, ridges and fillets, where traditional gauges cannot be wired,
- when very narrow gauges, used on the edge of a relatively thin plate, on ribs, or on a very small blades, must be used,
- in the case of measurements in closed cavities, such as car or aircraft tyres, or cavities in concrete structures.

In addition, in cases where installation is possible, installation of these metal gauges is expensive in terms of metal conducting wires for the electrical junctions and the junctions for transmission of the deformation signal, and is difficult due to the substantial encumbrance and the many connections required to collect, differentiate, identify and process each of the gauges used, without inverting two gauges.

The problem of finding a new type of gauge and a new gauge manufacturing method, notably enabling the above problems to be resolved, is thus posed.

ACCOUNT OF THE INVENTION

To address these problems the invention concerns a deformation measuring device including:

a) at least one strain gauge, producing a signal when it is deformed, b) at least one substrate, including at least signal processing means and/or means of transmission of the signal by radiofrequency, c) means to connect the gauge and the substrate mechanically, including an elastic layer positioned between the gauge and the first substrate.

Means enable the gauge and the substrate to be connected through the elastic layer.

The gauge may be positioned on one face of a flexible support, where the other face of the support is intended to be attached to, or brought into contact with, or glued to, a test body the deformation of which it is desired to measure. In a device according to the invention the gauge faces the elastic layer and the first substrate, while the flexible support is applied against the surface a deformation of which it is desired to measure.

The elastic layer, positioned between the gauge and the first substrate, enables all or part of a deformation which is to be measured to be absorbed. The gauge is therefore sensitive to this deformation, but the deformation is not transmitted to the substrate. The latter receives only the electrical signals reflecting the deformation, and which are transmitted to the signal processing means and/or signal transmission means. The presence of the elastic layer also allows the substrate to be prevented from restricting the deformations of the gauge.

According to the invention, the means for assembling the gauge and the first substrate mechanically are securing means including a layer of material having elastic properties positioned between the gauge and the first substrate. Elastic properties is taken to mean mechanical properties, in particular elastic deformation properties, which are sufficient to allow the securing means to absorb elastic deformations of the strain gauge without transmitting, or transmitting as little as possible, these deformations to the first substrate, and without limiting the extent of these deformations in the strain gauge.

Thus, the first substrate is mechanically attached to the gauge without limiting its deformations. The risk of limiting or blocking the deformation of the gauge, and thus of limiting the sensitivity of the gauge, is thereby reduced.

This layer with elastic properties is made, for example, from elastomer or resin. It may be made from polyurethane or from a silicon-based elastomer. This layer may be a flexible adhesive film.

Generally, this layer:

has a hardness which may be between 33 and 95 Shore A or between 33 and 55 Shore D, and/or is between 10 µm and 200 µm thick, for example, and/or has a composition chosen in terms of the deformation during the stressing of the gauge and the temperature range in use, in order not to limit the deformation of the gauge nor to become damaged.

This layer may or may not be adhesive in a ready-to-use device according to the invention; in particular it may be made from a material which is initially adhesive and which, after a cross-linking or drying or polymerisation, no longer has any adhesive or gluing properties, except with that which was previously glued. It is, for example, a polyurethane or a silicon-based elastomer, or an elastomer resin. In the remainder of the description, the terms "flexible film" or "adhesive film" will be used indiscriminately to describe the securing means.

According to the invention, the measured data requires no wiring external to the device to be provided to means of processing and/or means of RF data transmission.

According to one embodiment, the means of electrical connection traverse the means which connect the gauge and the substrate mechanically. For example, a film or a layer, which assembles both elements, is traversed by electrical connections.

Thus, there are no longer any wires to be positioned between a gauge applied to an object or to a structure and signal processing means and/or means of RF data transmission.

The strain gauge includes, for example, a metal track on a generally flexible support, enabling it to be glued to a non-flat surface. In what follows, for the sake of simplification, this support will be called a "flexible support", although the invention is not limited to the case of a flexible support. When the test body to which the gauge is attached is subject to a deformation, this gauge is subject to a deformation which is transmitted by the flexible support to the metal track, modifying its resistance. The flexible support is facing the structure the deformations of which are to be measured, and the gauge is facing the first substrate.

Advantageously, such a device includes means of transmission of the signal by radiofrequency, preferably of the RFID type. Thus, a device according to the invention is stand-alone, and requires no wiring to process the data and/or to transmit the deformation measurements. This may possibly enable a device according to the invention to be positioned in a closed environment. As a variant, wired connections allow the transmission to be made.

Such a device may also include means forming an antenna for the signal transmission means.

In a particular case it is the gauge, including a metal track, which forms an antenna for the signal transmission means. As a variant, means forming an antenna may be plated on the first or second substrate.

In a device according to the invention, a second substrate may be assembled mechanically with the first. For example, they are glued one to the other, each by one of its faces. At least one of the substrates may include means for reconnection of electrical connections, for example in the form of a chamfer. The two substrates may be connected electrically to the connection means. In a particular embodiment, these connections are attached on one side to contact extensions formed on a chamfer present on the front face of the first circuit or substrate or integrated circuit, and on the other side to contact pins present on the second substrate or integrated circuit. One of the substrates may include at least a part of the means of transmission, and the other substrate a part of the signal processing means.

Each of the data processing means and of the radiofrequency transmission means may be made in the form of an electric circuit, integrated in the first substrate or in the second substrate.

A device according to the invention may be associated with electric supply means, to power the gauge and/or processing means and/or signal transmission means. For example, the radiofrequency transmission means include a device for remote power supply by radiofrequency of the RFID type. They may be combined with the means of transmission, particularly of the RF type. Or again, a battery or micro-cell is secured with the gauge or with the processing means and/or signal transmission means. Power may also be supplied by an external source. The electric supply means may be formed on the first or second substrate.

The invention also concerns a method of manufacture of devices such as those described above.

The invention therefore also concerns a method of manufacture of at least one deformation measuring device including the assembly of at least one strain gauge and a first substrate including at least signal processing means and/or means of transmission of the signal by radiofrequency.

A step of formation of means to connect the gauge and the substrate electrically may also be accomplished.

Multiple deformation measuring devices according to the invention are preferably manufactured in batches. According to this manufacturing method, multiple measuring devices according to the invention are manufactured on the first substrate, which itself includes multiple signal processing means and/or signal transmission means, where step a) includes the assembly of multiple strain gauges with this first substrate. Each gauge is then associated with signal processing means and/or signal transmission means.

A step of individualisation of each measuring device may be accomplished by cutting the first substrate. The assembly of both substrates is advantageously cut when a second substrate is already glued to the first.

The mechanical assembly step may be accomplished by means of a layer of material having elastic properties, coated, for example, on the first substrate. Reference may be made to what has been described above concerning this layer.

The step of formation of means to connect the gauge and the substrate electrically may include the formation of electrical connections through this layer.

The mechanical assembly step enables the gauge and the first substrate to be assembled mechanically and secured, even if this is accomplished by means of a layer having a certain elasticity.

A second substrate may also be assembled on the first substrate. This second substrate may also include one or more circuits, for example an RF data transmission circuit. Electrical connections may be made between this circuit and a circuit of the first substrate. Means for reconnection of electrical connections may be manufactured on the first substrate and/or on the second substrate. Electrical supply means, to power the gauge and/or processing means and/or signal transmission means, may also be included. Concerning these means, reference will be made to the explanations previously given above.

The invention also concerns a method for measuring deformations including the application of a measuring device according to the invention, where the flexible support, on which the strain gauge is positioned, is attached or glued to the surface the deformations of which are to be measured, and where the elastic layer is positioned between the gauge and the first substrate.

As previously explained above, it is therefore the elastic layer, positioned between the gauge and the first substrate, which enables the absorption of all or part of a deformation which is to be measured, and which prevents the deformations of the gauge from being limited. The latter is therefore more accurate.

BRIEF DESCRIPTION OF THE ILLUSTRATIONS

DETAILED ACCOUNT OF PARTICULAR EMBODIMENTS

The invention concerns a device for measuring deformations or stresses of a test body. The signal is sampled, during a deformation of a metal gauge, and may be processed by the device itself and possibly transmitted.

More specifically, the invention notably concerns a metal gauge associated with means of processing the signal transmitted during a deformation of the gauge.

Figure 1A:
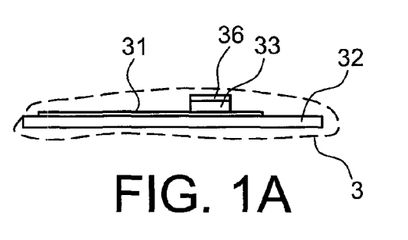
FIGS. 1A and 1B illustrate a strain gauge able to be used in the invention.

A metal gauge which can be used in a device according to the invention advantageously includes a metal portion 31, consisting for example of laminated or drawn-and-glued metal wires, present on a flexible support 32 (FIG. 1A).

The term flexible support is given to a support which can be glued on to a non-flat surface and take on its variations.

The gauge measures the deformations in a direction parallel to its wires. If it is desired to measure deformations in a direction perpendicular to the wires another gauge, the wires of which are aligned in this perpendicular direction, must be glued, or a gauge in the form of a rosette must be used. On this subject, reference may be made to the work of J. Avril, *Encyclopédie e d'analyse des contraintes* [Encyclopaedia of stress analysis], Micromesures, 1984, for example on page 242 of this work.

The flexible support may be a plastic or polymer film, for example a polyimide of the Upilex S type.

It is advantageously between 20 μm and 70 μm thick, but preferably between 20 μm and 50 μm thick: indeed, with higher thicknesses there is a risk that the transmitted stress will be lost.

Figure 1B:
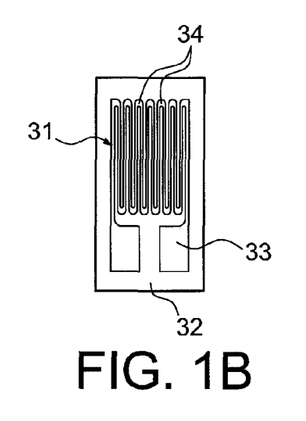

The metal portion preferentially includes a metal track forming loops 34 and at least two contact areas. In these contact areas contact pins 33 are advantageously present which may have a level, in a direction perpendicular to a plane including the metal track, different to that of the metal track (FIG. 1A-1B).

The material of the metal track is chosen in accordance with the sensitivity to deformations and to with the gauge's desired performance in terms of hysteresis, creep, temperature coefficient of resistance (TCR), and temperature coefficients of sensitivity (TCS). The chosen material is advantageously an alloy such as, for example, NiCuMn, or NiCr or NiCrSi or NiCrFe or PtW.

Gauges which can be used for the invention may be obtained from manufacturers such as SEEA, Vishay or Scaime.

The materials of the gauges allow maximum elongations, when the gauge is under stress, which vary according to the measuring field concerned. High-performance gauges are generally limited to 1 or 2% elongation (10 or 20 mm/m). Gauges in common use, having a flexible support made from polyimide, may have an elongation of between 5% and 15%. Gauges without supports, which are glued using a ceramic cement, are limited to 0.5% elongation. There are also gauges which are specially designed for large elongations, up to 20 or 25%.

In a device according to the invention, a metal strain gauge on a polymer film produces a signal, when a deformation of a value of the order of 0.01% to 2% occurs, of great accuracy, of the order of $10^{-4}$ of the full scale.

The temperature coefficient of the resistance is preferably close to 0, typically less than or equal to, in absolute terms, 5 ppm/° C. (therefore between −5 ppm/° C. and +5 ppm/° C.). It should be stipulated that the term temperature coefficient of the resistance TCR means the following quantity:

$$CTR = \Delta Rx((R1+R2)/2)^{-1} \times (\Delta T)^{-1},$$

Where:
R1 is the resistance at temperature T1,
R2 is the resistance at temperature T2,
$\Delta T = T1 - T2$.

Preferably also, the metal gauge has a possibility of compensating for the creep of the test body by an opposite creep of the gauge, enabling the measuring accuracy to be improved still further.

The publication of H. Grange et al., "Thin film strain gauges on polymers: main characteristics", sensors and actuators, A 46-47, 1995, p. 213-217 illustrates the measuring principle of the various parameters (temperature coefficient and creep).

In a device according to the invention, a metal strain gauge on a polymer film produces a signal, when a deformation of a value of the order of 0.01% to 10% occurs, and even as high as 25%, of an accuracy of the order of $10^{-3}$ of the full scale.

The metal strain gauge preferably has a very high resistance (for example between 1000 Ω and 5000Ω), allowing consumption to be limited.

In an advantageous embodiment of the invention, there may be a layer 36 of soldering material (made of InSn or SnPb or an lead-free alloy) in contact with the contact pins 33 of the strain gauge 3.

Figure 2A:
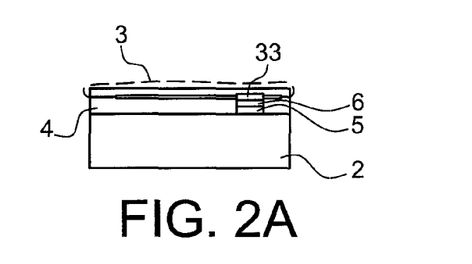
FIGS. 2A and 2B illustrate a device according to two embodiments of the invention, including one or at least two integrated circuits.
Figure 2B:
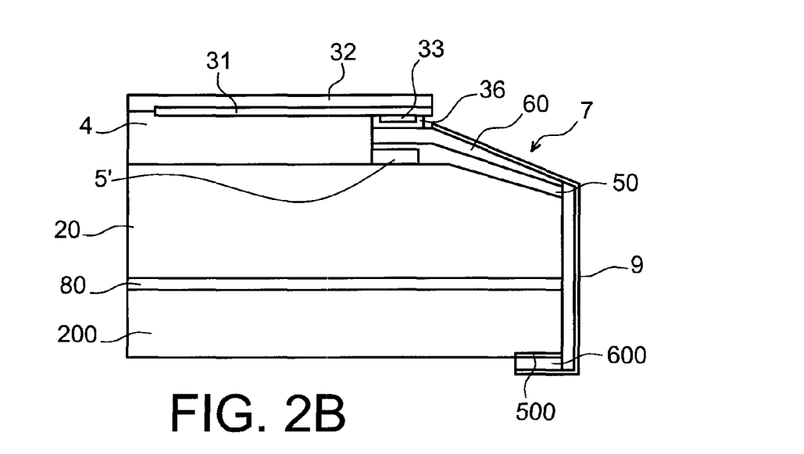

Two embodiments of a device according to the invention are described in FIGS. 2A and 2B.

A first embodiment of a device according to the invention, illustrated in FIG. 2A, includes a metal gauge 3 secured with a substrate 2 including signal processing means. This substrate 2 may be of the type used in the microelectronics industry; in particular it may be made of a semiconductor material.

The signal processing means include, for example, an electronic circuit which accomplishes the functions required for implementation of this processing. In an example embodiment, the substrate of the integrated circuit including the electronic circuit for processing the signal also includes, connected electrically and electronically to the said signal processing circuit, means or an electronic circuit for transmission of the signal, forming an electronic transmission circuit. Such transmission means enable data to be transmitted from the gauge to external means. The transmission of the signal is preferentially of the radiofrequency (RF) type.

These signal transmission means advantageously include means or a circuit of the RFID type. Circuits of the RFID type allow a remote power supply to be used, i.e. supply with energy by means of electromagnetic waves. It is then not necessary to provide additional electrical supply means, although these may be provided in order to provide for circumstances where remote powering is not possible. For example a battery may be associated with the device.

Gauge 3 can itself be used as a transmission and/or reception antenna to supply the device with electricity.

Each of the electronic circuits for signal processing and RF transmission of the signal is preferentially an integrated circuit which can be present on the surface of the substrate 2. There may be several circuits on the surface of the substrate.

The processing means and, if applicable, the transmission means may be coated with a protective cover (not represented), for example made from silicon or epoxy resin. For example, such a cover protects the interconnections and transistors comprising an electronic circuit, contained in these means, against damage such as chemical damage, or damage due to electromagnetic radiation.

Substrate or circuit 2 is mechanically connected to gauge 3 by means of securing means 4. Electrical connection means 5, 6 allow the gauge's signal to be transmitted to the data-processing means.

Securing means 4 preferably have sufficient elastic properties not to modify, or to modify as little as possible, the deformation of the gauge when the latter is subject to stress, and not to transmit, or to transmit as little as possible, the deformation of the gauge to the first substrate. These means 4 also have hardness and adhesion properties which are sufficient to mechanically connect or combine the gauge and the circuit's substrate. The distance between the gauge and substrate 2 and is therefore roughly constant. It is, in any event, less than a few hundred μm, for example less than 100 μm or than 200 μm. This distance is the sum of the thicknesses of the layers between the gauge and the substrate. This distance is preferably equal to the thickness of the securing means after drying or polymerisation, and is close to the coated thickness of the film or of the elastic layer 4.

These means 4 preferentially include an elastic film 5 μm to 150 μm thick, and advantageously between 10 μm and 130 μm thick.

One or more materials are preferably used for securing means 4, the hardness of each of these materials being less than 100 Shore A. Elastic film 4 is, for example, made of polyurethane (PU). For example, American Polyfilm manufactures films of TPU (thermoplastic PU) having a hardness of between 70 and 95 Shores A. These elastic films have excellent elasticity at low temperature; they conserve their elasticity down to a temperature of −50° C. In addition, these materials have very great breakage resistance: 4000 to 9500 psi.

Alternatively, elastic film 4 may be an elastomer of the silicon type. Indeed, the temperature range over which elastomers of the silicon type may be used is substantial (−60 to +250° C.), and their elasticity is high (Shore A hardness: 33 to 80).

Another possible example of a material which may be suitable for certain applications of the invention is a resin, if it has elastic properties as described above.

It may be, for example, a polyurethane-based resin of the NOA65 type produced by the company Epotecny.

The choice of the material used and of its composition is preferentially made according to the maximum elongation when subject to stress of the chosen gauge, and to the temperatures to which the gauge will be subject, so as not to influence the deformation of the gauge and to conserve adhesion between the gauge and the signal processing means and/or transmission means.

From an electric standpoint, there may be means for connection between gauge 3 and substrate or circuit 2. Thus, there may be at least two soldering pins 6, positioned in contact with at least two contact pins 5 present on first substrate 2. If there is a cover on the surface of the substrate, the contact pins 5 traverse the cover and allow electrical contact with the electronic circuit(s). An example of such a cover and of the formation of such contact pins 5 may be found in the article by H. Grange, et al.: "A Bi-axis Accelerometer with a Chip Size Packaging Technology for a Pacemaker Application" ESSDERC'98 pp. 200-203.

The soldering pins 6 may be made from indium, InSn or SnPb, or from a lead-free alloy.

The means of connection 5, 6 traverse the securing means 4 and electrically connect the substrate of circuit 2 and gauge 31. There may be more than two "soldering pins-contact pins" assemblies.

Figure 3A:
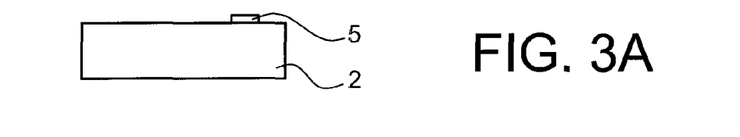
FIGS. 3A to 3E illustrate a first embodiment of a method according to the invention.
Figure 3B:
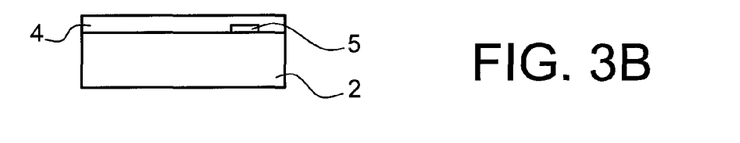
Figure 3C:
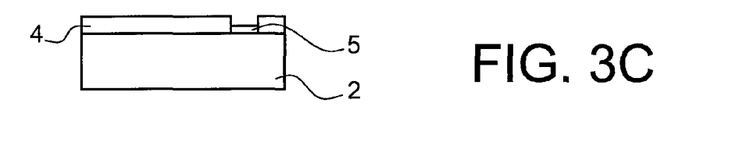
Figure 3D:
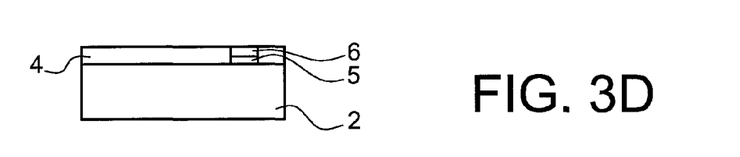
Figure 3E:
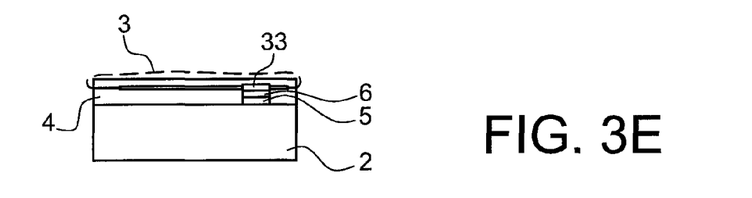
Figure 3F:
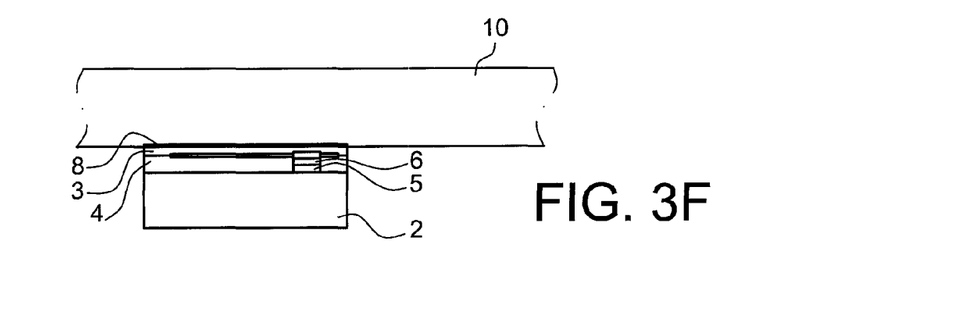
FIG. 3F represents a device according to the invention, in measuring position on a structure.

The device according to the invention may be glued on to a test body 10 the deformation of which it is desired to measure, or the stress of which it is desired to calculate (FIG. 3F). This gluing is generally accomplished by rigid fasteners 8, preferably a rigid glue having high shearing resistance and low elasticity. Alternatively, this may be a layer of ceramic cement, or any other rigid fastener. This layer of rigid glue 8 may be a layer of the epoxide type, for example of type M600 or M610 produced by Vishay, having the desired rigidity properties. This layer 8 keeps the strain gauge 3 in contact with the test body 10 through the flexible support of the gauge. This layer of glue 8, through its shearing resistance property, enables the deformations of the test body 10 to be transmitted to the gauge 3 with minimum loss. This thus allows maximum deformation, or a variation of maximum length, of the strain gauge 3, which is deformed in proportion to the applied stress, whether compression stress or traction stress.

A second embodiment of a device according to the invention is illustrated in FIG. 2B.

As with the first embodiment of the device according to the invention, it includes a gauge, for example of the type described above, which is attached to a first substrate 20 including at least means for processing the gauge's signal. The gauge 3 and the first substrate are connected by securing means 4, as previously explained above.

In this embodiment, certain characteristics of gauge 3 and of securing means 4 are identical to those of the first embodiment of the invention. They are therefore presented in FIG. 2B using the same references. Reference may be made to the above description with their regard.

In this embodiment there is a second substrate or integrated circuit, 200, which is different to the first substrate 20. Advantageously, one of the substrates or integrated circuits contains at least part of the means of transmission by radiofrequency, and the other contains the signal processing means.

In a case in which the first substrate contains means of processing the signal transmitted when the gauge is subject to stress, the second substrate 200 includes signal transmission means.

The first substrate 20 includes two main faces, the first containing for example an electronic circuit, and the second having no electronic circuit, possibly being made from silicon, for example. The first face faces the gauge, and the second face is roughly parallel to the first, and is opposite it. In addition, substrate 20 may include means enabling the electrical connections on one of the sides of the first face to be reconnected. For example, on one of the sides of the first face, the first substrate 20 includes a chamfer 7, forming an angle such that the thickness of the substrate is lesser close to the outer edge containing the chamfer than in the interior or centre of the substrate 20.

On chamfer 7 there may be connection means, for example metal tracks or extensions 50 connected to the electronic circuit contained in substrate 20 by means of contact pins 5' traversing the cover, if present. On these tracks 50 one or more layer(s) of soldering material 60 may be positioned.

The electronic circuits present in each of the integrated circuits 20, 200 may advantageously be coated with a cover, for example made from silicon or epoxy resin, which protects the interconnections comprising the electronic circuits against chemical damage or damage due to electromagnetic radiation. Chamfer 7 is then formed from the material of the cover, so as not to damage the electronic circuit present under the cover.

The second substrate or integrated circuit 200 has two faces, one of them, called the first face, containing an electronic circuit, where this first face may be covered with a cover, and may have contact pins 500. The other face, called the second face, has no integrated circuits. The two faces without circuits, or second faces, of the two integrated circuits 20, 200 are attached together by fasteners 80. These fasteners 80 advantageously include a layer or a glue which is flexible or rigid (since it plays no particular role in measuring a stress), for example of the Vishay M610 type, or a ceramic cement or any other fastener.

In addition, contact pins 500 of the second substrate 200 are advantageously covered individually by a thickness of soldering material 600, which forms a conducting layer. Through this thickness of soldering material, contact pins 500 of the second substrate or integrated circuit are electrically connected by connection means or connectors 9 to electrical connection means of the first substrate, for example to the soldering material 60 present on each contact extension 50 present on chamfer 7 of first substrate 20.

This second embodiment of a device according to the invention can also be attached on to a test body, the deformation of which it is desired to measure, with rigid fasteners 8 as described above, for example a rigid glue having high shearing resistance, of the M610 type produced by Vishay.

A device according to the invention, whatever its embodiment, may include or be connected to power supply means; for example, it is connected, via a connection using electric wires, to an electric network or a battery located outside the device. As a variant, a battery or a micro-cell may be attached to or integrated in the device.

However, the power supply means advantageously include remote power supply means by radiofrequency. In this case, there are means of transmission of the signal by radiofrequency, preferentially of the RFID type, and these means combine the remote power supply means and signal transmission means.

Similarly, in each of the two abovementioned embodiments, an antenna may be connected to the signal transmission means. The antenna is preferentially an electrically conducting grid which may be included on or in one of the electronic circuits or on gauge 3. The metal track 31 of strain gauge 3 advantageously acts as an antenna, and it is connected appropriately to the signal transmission means by contact pins. These contact pins can be those forming the electrical contact between the gauge and the first substrate or can be other contact pins.

If the antenna is included on second substrate 200, the conducting grid forming the antenna is advantageously in contact with the air.

As a variant, the antenna may consist of the test body 10 if the latter is metal and is not connected to any other current source.

Figure 5A:
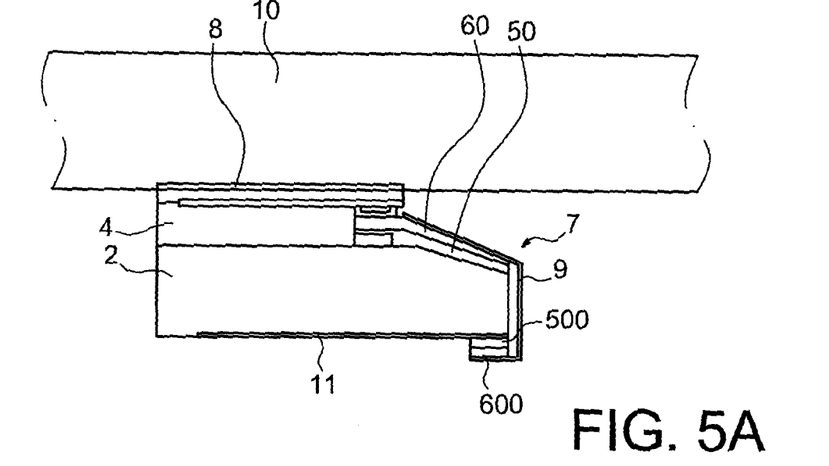
FIGS. 5A to 5C represent various devices according to the invention including means forming an antenna.
Figure 5B:
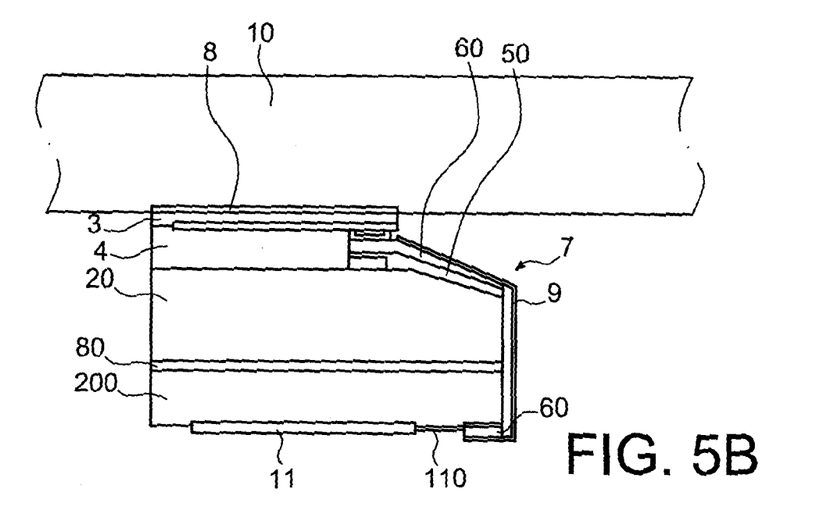
Figure 5C:
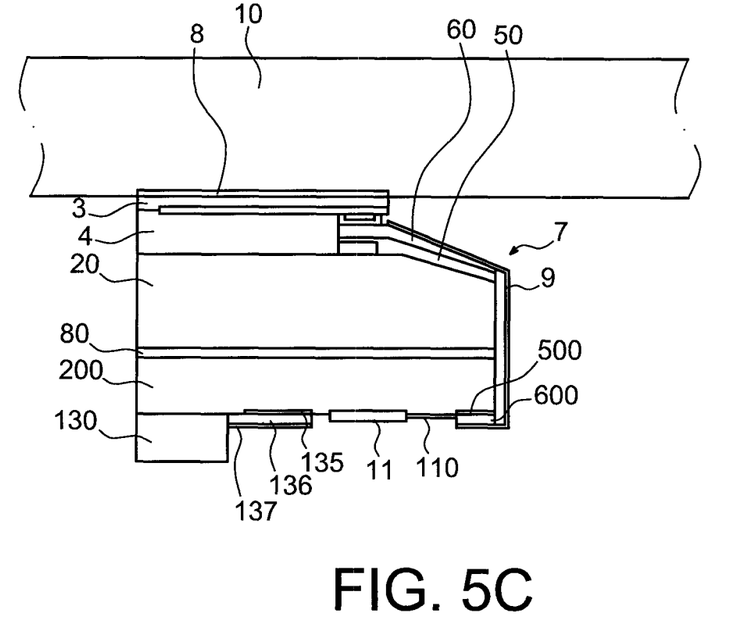

Devices according to the invention and including means forming antennae are illustrated in FIGS. 5A to 5C. In these figures each device is connected to a test body 10.

In the case illustrated by FIG. 5A a metal layer 11 forms an antenna, and it is glued to the face free of circuits of first substrate 2, on the side opposite the gauge. Contact pins 500 are positioned on metal layer 11. The first substrate 2 includes two main faces, the first containing for example an electronic circuit, and the second having no electronic circuit, possibly being made from silicon, for example. The first face faces the gauge, and the second face is roughly parallel to the first, and is opposite it. In addition, this substrate 2 may include means enabling reconnection of the electrical connections on one of the sides of the first face. For example, on one of the sides of the first face, the first substrate 2 includes a chamfer 7, forming an angle such that the thickness of the substrate is lesser close to the outer edge containing the chamfer than in the interior or centre of the substrate 2.

On chamfer 7 there may be connection means, for example metal tracks or extensions 50 connected to the electronic circuit contained in substrate 20 by means of contact pins 5' traversing the cover, if present. On these tracks 50 one or more layer(s) of soldering material 60 may be positioned. A thickness of soldering material 600 forms a conducting layer.

Through this thickness of soldering material, contact pins 500 of the antenna are electrically connected by connection means or connectors 9 to electrical connection means of the first substrate, for example to the soldering material present on each contact extension 50 present on chamfer 7 of first substrate 2.

The same soldering material can advantageously form each of the layers of soldering material of the device according to the invention: 6, 36, 60, 600.

The case illustrated by FIG. 5B is that of a device including two substrates 20, 200, of the type previously described above in connection with FIG. 2B. A metal layer 11 forming an antenna is also positioned on the face of second substrate 200, which is not glued to first substrate 2. This metal layer is connected to contact pins 500 present on the second substrate by means of conducting extensions 110 which can form part of metal layer 11. Second substrate 200 may or may not include an electronic circuit.

The device illustrated in FIG. 5C is a device comparable to the one illustrated in FIG. 5B, but also including a micro-cell 130 positioned on the face of second substrate 200, which is not glued with first substrate 20. This micro-cell 130 is connected to second substrate 200. It may additionally be connected electrically to second substrate 200, for example by means of conducting extensions 137 connected to micro-cell 130. These extensions 137 can be connected electrically to contact pins 135, present on substrate 200, for example by a layer of material of low melting temperature 136.

It is also possible to position a micro-cell on the back of a device according to the first embodiment of the invention, for example in the embodiment described above in connection with FIG. 5A.

The invention also concerns methods for the manufacture of a device according to the invention. These methods are illustrated in FIGS. 3A-3E and 4A-4G.

The first method according to the invention, illustrated in FIGS. 3A to 3E, concerns a method of production of a device according to the first embodiment, illustrated in FIG. 2A.

Firstly an integrated circuit 2 is chosen, including at least signal processing means and, for example, means of signal transmission by radiofrequency. These means are, for example, in the form of an electronic circuit included in an integrated circuit or on a substrate, and have at least two contact pins 5 (FIG. 3A). Each pin is, for example, made by successive plating of chromium, nickel and gold, for example with respective thicknesses of 10 nm, 300 nm and 100 nm.

On the face of integrated circuit 2 including contact pins 5 an adhesive flexible film layer 4 having elastic properties is coated, the technical characteristics of which after gluing are those described above (FIG. 3B).

This film 4 may be coated as a spray or, preferably, by spin-coating. It may consist of functional cross-linking agents and of a catalyst which is cross-linking at ambient temperature, for example in the case of a silicon film, or it may be a cross-linking film or a film which self-organises by drying at ambient temperature or by firing, for example at 150° C. It may be a silicon film, or a polyurethane or a photosensitive resin having elastomer properties.

A coating technique of the "spin coating" type is preferably used in order to coat a polyurethane layer 4, or a "spray" type technique to coat a silicon layer. This step may be followed by polymerisation. The upper adhering surface of elastic film 4 may be protected by a strippable protective film: more specifically, a very thin film may be put on the surface of the adhesive layer to protect its adhesion properties during the following steps of resin coating, photolithography, engraving of layer 4 and plating of soldering material 6. This film may be removed before gauge 3 is glued.

Layer 4 is then subjected to a step of photolithography (FIG. 3C), including a coating of resin, an exposure and an engraving of the adhesive film 4 present under the part of the resin which has been removed. This step enables the contact pins 5 present under adhesive film 4 to be revealed.

A soldering material 6 is then plated in the openings formed in adhesive film 4, in contact with contact pins 5 (FIG. 3D).

This soldering material is a conducting material with a low melting temperature, of less than 350° C. or 200° C. It may be a layer of indium, InSn or SnPb, or of a lead-free alloy, and in particular one made of Indium 50%-Tin 50% (T° f. [melting temperature]=115° C.) or Tin 63%-Lead 37% (T° f.=183° C.). This soldering material 6 may be put in place by means of dipping in a molten soldering bath ("dip soldering" or "molten solder bath") or by "Flip Chip" (for a plating of micro-beads made of a fusible alloy), adding a level of metallisation and of photolithography to define electrolytic growth areas, or again using a plating machine ("Solder ball"). In—Sn soldering is advantageously used due to its melting point, which is lower than the other soldering materials.

A strain gauge 3 is also prepared including a metal track 31 present on a flexible support 32 and contact pins 33, as described above, in connection, for example, with FIG. 1A.

A layer of soldering material 36 may advantageously be plated on the contact pins of strain gauge 3. This may, for example, be the same soldering material as the one plated in the openings formed in the adhesive film, in contact with the contact pins, in the integrated circuit.

Strain gauge 3 is then brought into contact with adhesive film 4, where the face containing the metal track is in contact with the adhesive film, and where contact pins 33 of the gauge are in contact with soldering material 6 (FIG. 3E).

For example, a pressure of between 0.5 bar and 3 bars may be applied to flexible support 32 of metal gauge 3 so as to complete the gluing. As a variant, a uniform plating of the film of the metal gauge on film 4 may be accomplished by vacuum bagging, as described below in connection with FIGS. 6A-6C.

A heating step may advantageously be accomplished, for example simultaneously with the pressurisation step. This heating step is adapted to suit the materials used. The temperature of the heating step is preferably lower than the decomposition temperature of adhesive film 4 and close to or higher than the melting temperature of soldering material 6. The temperature of the heating step is advantageously higher than, and close to, the cross-linking or polymerisation temperature, or the drying temperature, of the adhesive film. This heating step advantageously enables the adhesive film to be cross-linked or dried, so as to obtain a satisfactory gluing quality.

This step also enables the layers of soldering material 6, 36 to be softened and/or melted, so as to obtain satisfactory electrical contacts between contact pins 5 of integrated circuit 2 and contact pins 33 of strain gauge 3. It may be effected under pressure, for example one bar or several bars, in order to complete the contact connections. If the heating step is accomplished under pressure, as indicated above, advantageously it is sufficient to reach the softening temperature of the soldering material, 6, 36 and 60, in order to obtain satisfactory soldering between contact pins 5, 33. This prevents or limits the risk that the soldering will spread from the contact pins, and the risk of short-circuits. According to one example, the temperature reached in this heating step is approximately 115° C. Satisfactory electrical contact is favoured if the materials of the two contacts are identical; soldering material 6 is preferably therefore identical to soldering material 36 of the gauge.

When several devices according to the invention are manufactured in batch on a common substrate, as explained above in connection with FIGS. 7A-7E, an additional step of cutting enables each of the elementary devices to be individualised.

After this, the device formed in this manner may be attached on to a test body 10, the deformation of which it is desired to measure (FIG. 3F). For this step rigid fasteners 8 are used, as described above. If the fasteners 8 consist of a glue or an adhesive film, a pressure of between 1 bar and 3 bars, and a temperature corresponding to the temperature indicated by the manufacturer of the fasteners are preferentially applied: for example 112° C. for 3 h or 140° C. for 2 hours. The glue used preferably has very high shearing resistance; this is the case, for example, with glue of the Vishay M610 type.

A second method according to the invention is illustrated in FIGS. 4A to 4G. Such a method notably enables a device according to the second embodiment of the invention to be produced, including means of transmission by radiofrequency, and signal processing means.

According to this second method, it is possible to manufacture means to reconnect electrical connections on the substrate associated with the gauge, particularly in the form of a chamfer.

In the case where the means of transmission by radiofrequency and the signal processing means are on different substrates, there are generally at least two integrated circuits, a first integrated circuit and a second integrated circuit, which can be protected by protective covers, as described above. One of these integrated circuits contains at least one electronic circuit able to form signal transmission means, and at least one second integrated circuit contains at least one electronic circuit able to form signal processing means.

In a preferential variant of this embodiment, the signal processing means are included in the first integrated circuit. However, according to a variant, the signal processing means can be included in the second circuit, and the transmission means can then be included in the first integrated circuit. The remainder of the description concerns these two variants of the method.

In addition, the first integrated circuit chosen may be isolated, or may be present on a wafer of semiconductor material, surrounded by other identical integrated circuits. The following description presents this variant of the method.

A wafer of semiconductor material, containing first integrated circuits 20, 20', containing signal processing means able to process the signal transmitted by a strain gauge 3 when it is subject to stress, is produced. The circuits are in fact produced symmetrically relative to a plane perpendicular to the plane of the substrate or of the wafer, and perpendicular to the plane of the FIG. 4A. These integrated circuits are advantageously covered with a cover and include visible contact pins 5' traversing the cover, connected to the electronic circuit. In this case too, the pins of a circuit are symmetrical with the pins of the other circuit, relative to the plane previously mentioned above. An example of composition of the pins (by plating of chromium, nickel and gold) has previously been given above, and may be used for the present variant, by example with the previously mentioned thicknesses.

Figure 4A:
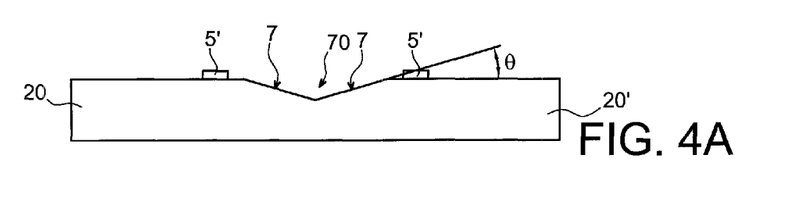
FIGS. 4A to 4G illustrate a method according to a second embodiment of the invention, where the processing means and/or signal transmission means include at least two integrated circuits.
Figure 4B:
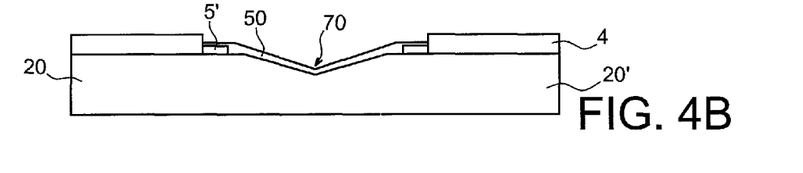
Figure 4C:
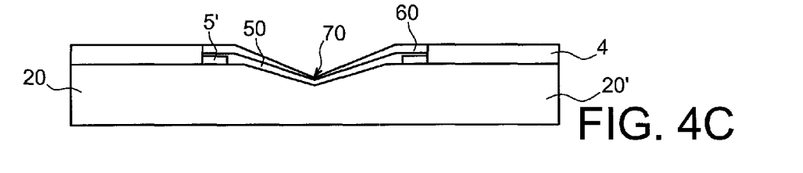

Preceding the coating of the adhesive film 4 on the first integrated circuit 20, one of the sides of the integrated circuit may be subjected to an abrasion 70 at an angle θ relative to a plane consisting of the surface of the integrated circuits, so as to form a chamfer 7 or an inclined plane relative to this surface of the integrated circuits (FIG. 4A).

This side will advantageously form one of the ridges of the first face of the substrate, containing the electronic circuit and contact pins 5' connected to this electronic circuit.

This abrasion is effected between two first integrated circuits so as not to damage either the electronic circuits, in this case signal processing means, nor contact pins 5'; this abrasion is therefore symmetrical for two adjacent integrated circuits. This abrasion may be accomplished by mechanical grinding with a bevel-shaped grindstone, also known as a "V-shaped grindstone".

After this, a layer of metal material is plated on the first circuits, forming contact extensions 50 on the sides of the chamfer 7.

These extensions are connected to the electronic circuit at its various contact pins 5', without inter-connecting them. There is then a coating of an adhesive film 4, followed by a photolithography of this film, revealing the chamfer 7. The properties of adhesive film 4 are identical to those described above (FIG. 4B). The aspects previously described above in connection with FIG. 3B may be applied to the present variant.

After this, a thickness of soldering material 60 of the same type as the one presented above (FIG. 4C) is plated on to contact extensions 50. This layer of soldering material 60 does not interconnect contact extensions 50. The aspects previously described above in connection with FIG. 3D may be applied to the present variant.

After this, a system including at least one strain gauge 3, as described in the previous embodiments, is plated on first integrated circuits 20. In particular, the wafer of semiconductor material may contain one or more first integrated circuits, as presented above. If there are several circuits, each one of which is intended for a gauge, the system of strain gauges 3 advantageously includes as many strain gauges as there are first integrated circuits 20; these gauges are then interconnected, for example, by their flexible supports 32. Gauges 3 are plated and glued on to the wafer containing the integrated circuit or circuits, such that their respective contact pins 33 and, if applicable, the layer of soldering material 36 which covers them, are in contact with soldering material 60 (FIG. 4D) present above contact pins 5'.

Figure 4D:
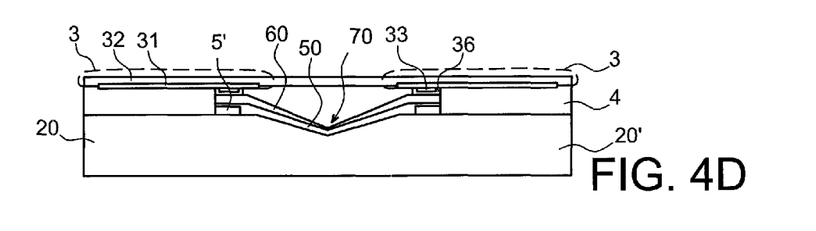

No part of the gauges is in contact with the soldering material present on the chamfer. Contact pins 33 of the gauges are in contact only with soldering material 60 located directly above contact pins 5' of the integrated circuits.

For example, a pressure of between 0.5 bar and 3 bars may be applied to flexible support 32 of metal gauge 3 so as to complete the gluing. A heating step may advantageously be accomplished, for example simultaneously with the pressurisation step.

This heating step is adapted to suit the materials used. The temperature of the heating step is preferably lower than the decomposition temperature of adhesive film 4 and close to the melting temperature of soldering material 6. The temperature of the heating step is advantageously higher than, and close to, the cross-linking or polymerisation temperature, or the drying temperature, of adhesive film 4. The heating step enables adhesive film 4 to be cross-linked or dried, so as to obtain a satisfactory gluing quality.

It also enables the layer of soldering material 60, 36 to be softened and/or melted, so as to obtain satisfactory electrical contacts between contact pins 5' of integrated circuit 2 and contact pins 33 of strain gauge 3. With the heating step being accomplished under pressure, its temperature preferentially reaches the softening temperature of soldering material 6, 36, 60. This is sufficient to obtain satisfactory soldering between the contact pins, and it prevents or limits the risk that the solder of the contact pins will spread, and the risk of short-circuits.

The aspects previously described above in connection with FIG. 3E may be applied to the present variant.

Figure 4E:
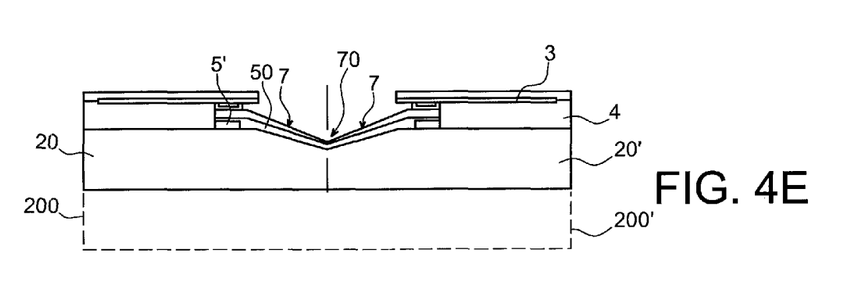
Figure 4F:
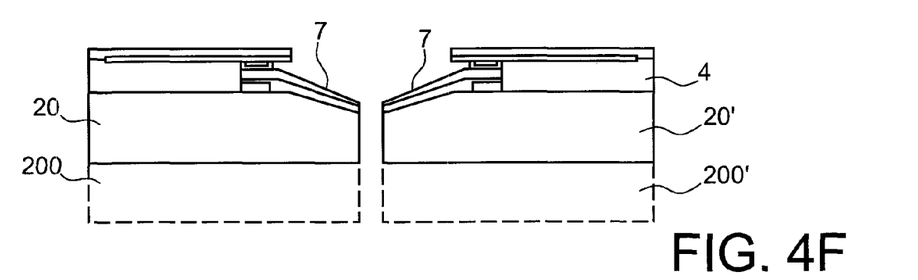

After this, a step to clear the area around chamfers 7 occurs. This occurs by eliminating the portion of the system of gauges 3, in particular the portion of flexible support 32, which is located above the abraded part 70 forming chamfers 7 (FIG. 4E). This may be obtained by steps of localised photolithography and engraving, or by a step of mechanical cutting, for example using a scalpel, which is simpler than photolithography.

A step of separation of the various first circuits 20 (FIG. 4F), by the part connecting chamfers 7, between two systems each of which consists of a circuit and a gauge may then be accomplished. This step may be accomplished, for example, by laser or mechanical cutting. This step of separation is preferentially accomplished by means of mechanical cutting with a diamond-impregnated saw and laser guide. Here again, in the case of devices according to the invention produced in batches on a common substrate, each device is individualised, as described below in connection with FIG. 7E.

If it is desired to produce devices containing a second circuit 200, for example like that of FIG. 2B, the following steps are taken: before each device is individualised, a second wafer 200, 200' (represented with dashed lines in FIG. 4E) is assembled with the first wafer containing first circuits 20, 20'. This second wafer contains the electronic means enabling signal processing and/or transmission means to be produced, or such means, among the signal processing means and the means of signal transmission by radiofrequency, which are not present in the first integrated circuits, to be produced. The second wafer preferably already has soldering pins 500 (see FIG. 2B).

This second integrated circuit 200 includes a front face and a rear face, where the front face is defined as the one having contact pins 500. On these pins a layer of soldering material 600 is plated. The second integrated circuit may include a cover which covers the electronic circuit or circuits providing the signal processing or signal transmission function.

The second wafer 200, 200' is attached to the first 20, 20' by its rear face. The front face of the first wafer 20, 20' is covered by strain gauge 3, and the two integrated circuits 20, 20' and 200, 200' are attached by their rear faces.

Circuits 20, 20', 200, 200' are advantageously attached by rigid or flexible fasteners 80. They may include a rigid glue or a ceramic cement, such as those used to attach the strain gauges to the test bodies, or a flexible glue.

This attachment step may be completed by the application of pressure. The temperature used to harden, or cross-link, the glue used for this attachment advantageously does not exceed the melting temperature of the soldering materials used.

A step of separation of the various first circuits 20 (FIG. 4F), by the part connecting chamfers 7, between two systems each of which consists of a circuit and a gauge may then be accomplished. This step may be accomplished, for example, by laser or mechanical cutting. This step of separation is preferentially accomplished by means of mechanical cutting with a diamond-impregnated saw and laser guide. Here again, in the case of devices according to the invention produced in batches on a common substrate, each device is individualised, as described below in connection with FIG. 7E.

Figure 4G:
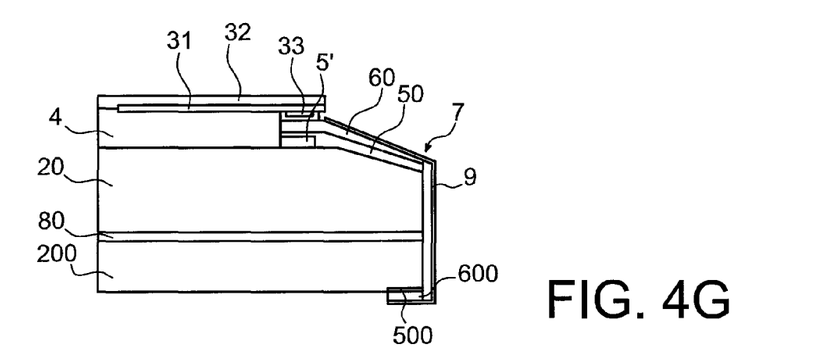

After this, connectors 9, which are conducting, are positioned, in contact on one side with soldering material 60 covering contact extensions 50 present on chamfer 7, and on the other side in contact with the layer of soldering material 600 present on contact pins 500 of the second integrated circuit (FIG. 4G). This step is followed by a step of soldering of connectors 9 on, respectively, contact pins 500 of the second integrated circuit and contact extensions 50 present on chamfer 7 of first integrated circuit 20 by means of layers of soldering material 60, 600 which cover them.

Figure 4H:
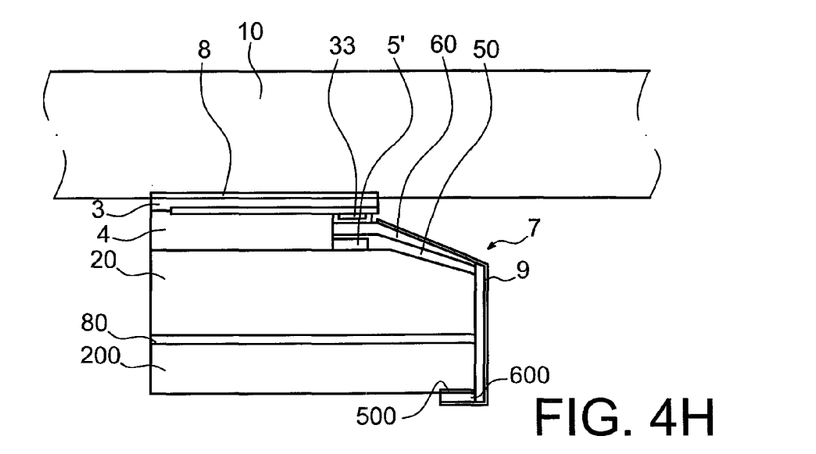
FIG. 4H represents a device according to the invention, in measuring position on a structure.

A device formed in this manner may be attached on to a test body 10, the deformation of which it is desired to measure (FIG. 4H). For this step rigid fasteners 8 are used, as described above. If the fasteners 8 consist of a glue or an adhesive film, a pressure of between 1 bar and 3 bars, and a temperature corresponding to the temperature indicated by the manufacturer of the fasteners are then applied: for example 112° C. for 3 h or 140° C. for 2 hours. This temperature is preferentially chosen such that it is less than the melting temperature of the soldering materials used. The example of glue already given above in the case of the description of FIG. 3F may be used again in connection with the present variant.

It is also possible to proceed in a different order, i.e. to attach on to test body 10 a device obtained after the step described above in connection with FIG. 4F, and then to assemble second circuit 200 on the rear face of this device. Conducting elements 9 can then be formed on this assembly. But, as previously indicated, circuit 200 will preferentially be assembled with circuit 20, before cutting of the unit assemblies. Conducting elements 9 may be manufactured before or after the assembly is glued on to the test body.

Each of the embodiments of a device according to the invention may be produced in batches on a semiconductor substrate of diameter 100 mm, 200 mm or 300 mm to obtain several hundred or thousand individual components on the same support, which are cut into units at the end of manufacture.

One method to produce one or more metal gauges on a flexible support, for example of diameter 100 mm, 200 mm or 300 mm may be as follows.

Figure 6A:
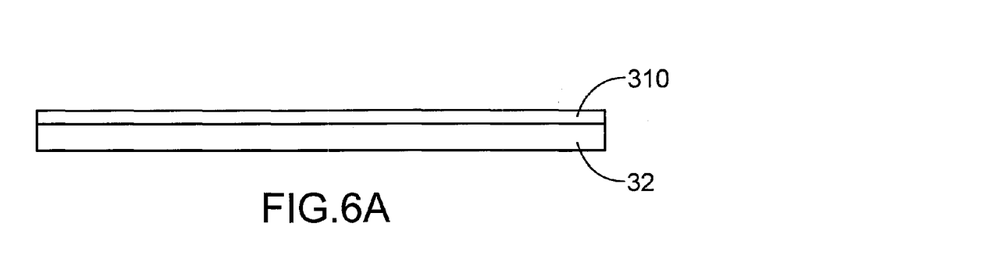
FIGS. 6A to 6C illustrate a gauge manufacturing method.
Figure 6B:
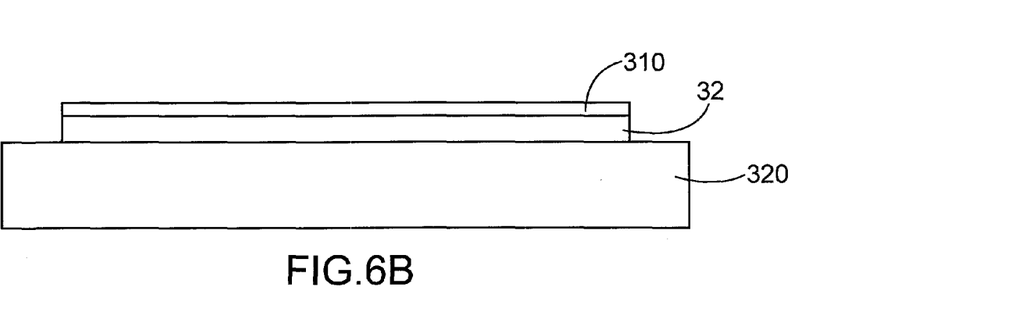

As illustrated in FIG. 6A, the gauges are produced by gluing a laminated film 310 or by vacuum deposition with cathodic sputtering of metal alloy on a film 32, for example between 25 μm and 50 μm thick. One resistor geometry is, for example, that of FIG. 1B, of the type involving parallel wires connected by loops at their ends. Such a gauge may be produced by photolithography and chemical engraving or ion milling. Contact pins 33 are made, for example, from CrNiAu. They can be plated and engraved by photolithography and chemical engraving or ion milling, or by vacuum evaporation deposition through a hard metal mask.

After plating of metal layer 310 on a film 32, for example made from a polymer material, the latter is plated on to a rigid support 320 (FIG. 6B) made of glass or silicon, on which it is held in place at several points by small adhesive strips or by double-sided sellotape (between the polymer and the rigid support).

Figure 6C:
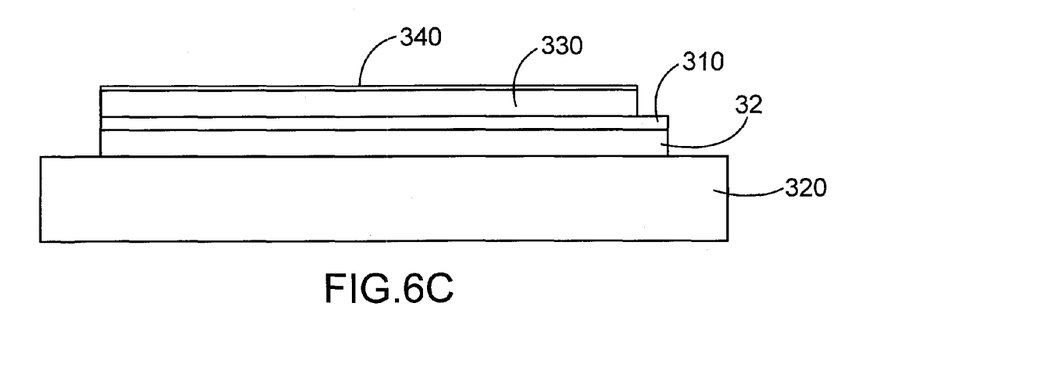

It is then possible to coat a resin 330 (FIG. 6C). The assembly is then placed in a kiln in order to dry the resin (at 90° C., for example).

A mask 340 defining the designs of the different gauges is then plated on the polymer film (FIG. 6C) for example through a transparent plastic bag (not represented in the figures), which has been pumped down to a vacuum before closing.

The mask is then made of chromium on glass. The gauge geometries are made from chromium, and the complement is transparent.

The latter is obtained by soldering the walls of the bag through a heating resistor. The vacuum enables the mask to be plated on to the metal film, favouring precise exposure of the resin, according to the patterns drawn on the mask.

The plastic bag is then removed for development of the resin and engraving of the resistors. The engraving technique used may be a dry engraving, or chemical engraving in a liquid medium.

All the gauges on their flexible support substrate 32 are then separated from substrate 320.

By this means it is thus possible to obtain a gauge structure such as the one represented in FIGS. 1A and 1B. This method has been used to produce a set of metal gauges on a common flexible support 32. Characteristics of metal gauges on the flexible support, for example described in the document of H. Grange et al., "Thin film strain gauges on polymers: main characteristics", sensors and actuators, A 46-47, 1995, p. 213-217.

The following stages can be implemented to produce devices according to the invention in batches, notably in combination with a production of gauges in batches, as described above. This succession of steps is particularly well adapted for a production in batches on a substrate, for example one made of silicon, which may be of diameter 100 mm, 200 mm or 300 mm, as indicated above. These steps are described by again using the elements of the previous figures, and the corresponding numerical references of these figures, for these same elements. Characteristics or steps described below can be combined with method steps already described above. The embodiment represented in FIGS. 7A-7E below is derived from what was described above in connection with FIGS. 3A-3E, but an identical description could be made from FIGS. 4A-4F.

Starting with a substrate 2, for example of diameter 100 mm, an adhesive, elastic film 4 of the polyurethane or silicon type (FIGS. 7A and 7B) is firstly coated on this substrate. This film is between 20 µm and 200 µm thick, for example. The substrate includes or contains the RFID-type measuring circuit or circuits with metal pins $5, 5_1, 5_2, 5_3$ . . . for the electrical contacts.

After this, (FIG. 7C) an engraving of film 4 is made, in order to produce openings to reveal the electrical contacts of the different gauges.

Figure 7A:
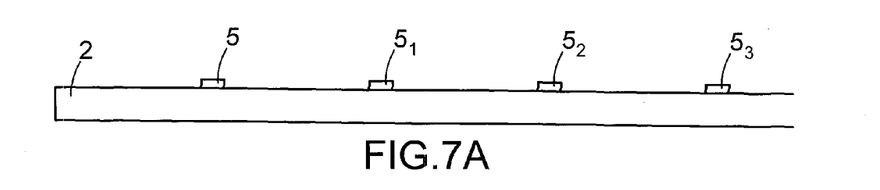
FIGS. 7A to 7E illustrate a method of manufacture by batch of the invention.
Figure 7B:
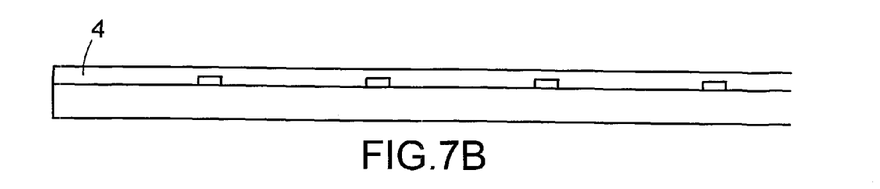
Figure 7C:
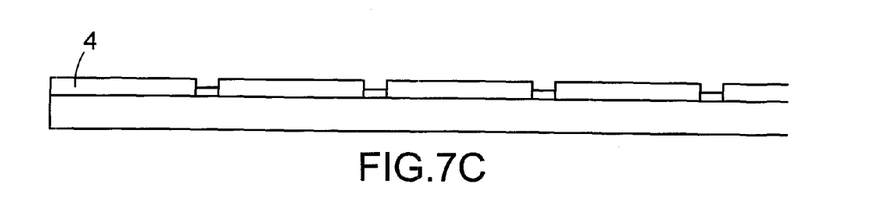
Figure 7D:
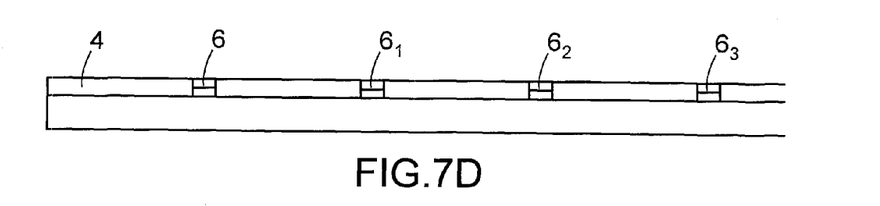
Figure 7E:
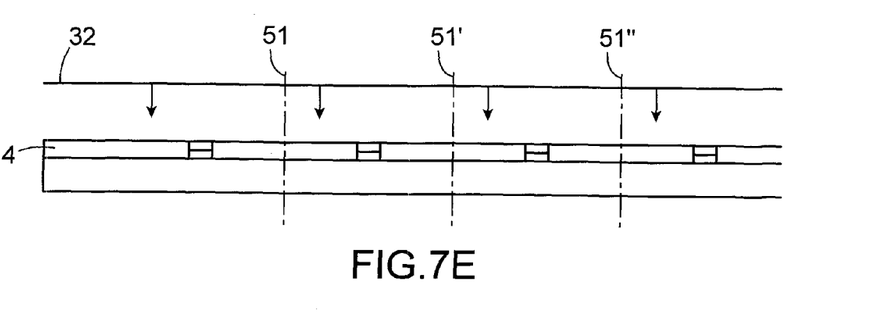

To this end, a resin coating is made, followed by an exposure according to the opening patterns defined by a mask and revelation, by a plasma engraving method using, for example, O2, in order to allow the passage of the electrical interconnections to be opened in film 4.

After this, (FIG. 7D) the metal interconnections $6, 6_1, 6_2, 6_3$ . . . are plated, using for example indium, InSn or SnPb (lead-tin) or a lead-free alloy by dipping in a molten solder ("Dip soldering" or "molten solder bath") or by metallisation through a hard mask or with a plating machine ("Solder ball") or by plating of microbeads made of a fusible alloy.

The gauges formed on film 32, as explained above, can then be glued on to film 4 (FIG. 7E). The connections between contact pins 33 of each gauge (these pins are not represented in FIG. 7E) and metal interconnections $6, 6_1, 6_2, 6_3$ . . . can then be produced. Gluing is accomplished such that each metal gauge is facing film 4 or facing an adhesive layer coated on this film, and is therefore in contact either with film 4 itself, or with this layer of adhesive. The latter is chosen such that the gauges may have satisfactory properties, and to prevent them from moving, whilst not limiting the deformation of the metal grid under the effect of the stresses to be measured.

It is then possible to cut individual chips, each including one or more strain gauges, and at least one measuring circuit. The cutting is, for example, undertaken using a diamond-impregnated saw. The cutting areas are represented schematically in FIG. 7E and are designated in this figure by references 51, 51', 51".

Finally, it is possible to glue each chip individually on to the stress area to be measured, as previously explained above in connection with FIGS. 3F, 4H, 5A-5C.

The invention applies advantageously in a number of cases:
in the case of a gauge with long outputs or when it is impossible to have, above the point where the gauge is to be positioned, sufficient space to accomplish the soldering and the wiring: for example in the case of a stack of plates of an electric motor, or in the case of a transformer, or where gauges must be positioned through narrow slits,
when a large number of gauges must be used, for example to measure a stress gradient; in this case it may be necessary to use 1,000 gauges according to the invention, or more,
when measuring on edges, ridges and fillets, where traditional gauges cannot be wired,
when very narrow gauges, used on the edge of a relatively thin plate, on ribs, or on a very small blades, must be used,
in the case of measurements in closed cavities, such as car or aircraft tyres, or cavities in concrete structures.

Also, multiple gauges according to the invention can be applied to an aircraft wing, or to a concrete structure, for example a bridge or a dam, or again to other structures (for example: an architectural structure). The gauges can then number from a few gauges to several thousand, for example 2,000 or 5,000 or more. The invention concerns a measuring system which may include at least one gauge according to the invention, or several hundred or several thousand gauges, for example at least 100 or 500 or 1,000 or 50,000 or 10,000.

The invention claimed is:

1. A device for measuring deformation comprising:
a) at least one strain gauge, producing a signal following a deformation, wherein the strain gauge is positioned on a face of a flexible support favoring elongation of the strain gauge, and wherein the face opposite the strain gauge of the flexible support, which is configured to be brought into contact with, or glued to, a test body has the deformation which it is desired to measure;
b) at least one first substrate, including at least a signal processing electronic circuit and/or a signal transmission electronic circuit; and
c) an elastic layer of material having elastic properties positioned between the gauge and the first substrate to assemble the strain gauge and the first substrate mechanically, and wherein the elastic layer prevents the deformation of the gauge from being transmitted, or allows it to be transmitted as little as possible, to the first substrate, the elastic layer having a hardness value less than 100 Shore A and being made of at least one of polyurethane, an elastomer, and a resin,
wherein the device includes pins connecting the strain gauge and the first substrate electrically through the elastic layer.

2. A device according to claim 1, wherein the flexible support is a plastic or polymer film.

3. A device according to claim 1, further comprising an electronic circuit of signal transmission by radiofrequency or by wired connections.

4. A device according to claim 3, wherein the electronic circuit of signal transmission by radiofrequency is of RFID type.

5. A device according to claim 1, further comprising a signal processing electronic circuit and a signal transmission electronic circuit, and a second substrate, assembled mechanically with the first substrate, wherein one of the substrates includes at least the electronic circuit of transmission and the other substrate includes the electronic circuit of signal processing.

6. A device according to claim 1, further comprising a metal track forming an antenna for the signal transmission electronic circuit, formed by the strain gauge or plated on the first substrate or on a second substrate.

7. A device according to claim 1, wherein at least one substrate includes a chamfer to reconnect electrical connections, or to connect the transmission electronic circuit to the signal processing electronic circuit electrically.

8. A device according to claim 1, wherein the elastic layer is made from elastomer of silicon type.

9. A device according to claim 1, further comprising a micro-cell, or a power supply by radiofrequency, or a power supply by an external source to supply the gauge and/or the signal processing electronic circuit and/or the transmission electronic circuit.

10. A method of production of at least one deformation measurement device comprising:
assembling at least one strain gauge and a first substrate including at least a signal processing electronic circuit and/or a signal transmission electronic circuit;
inserting a layer of material having elastic properties between the strain gauge and the first substrate, wherein this layer of material prevents deformation of the gauge from being transmitted, or allows it to be transmitted as little as possible, to the first substrate, the layer of material having elastic properties having a hardness value less than 100 Shore A and being made of at least one of polyurethane, an elastomer, and a resin;
forming pins to connect the strain gauge and the first substrate electrically through the layer of material having elastic properties;
positioning the gauge on one face of a flexible support favoring the elongation of the strain gauge, wherein the face opposite the strain gauge of the flexible support is configured to be brought into contact with, or glued to, a test body that has the deformation desired to be measured, and
wherein the gauge and the flexible support are assembled before being positioned against a test body.

11. A method according to claim 10, wherein the forming of pins to connect electrically the strain gauge and the first substrate includes forming electrical connections through the layer of material having elastic properties, after coating of this layer on the first substrate and before the assembling with the strain gauge.

12. A method according to claim 10, further comprising production of multiple deformation measuring devices on a single first substrate, wherein the substrate itself includes multiple signal processing electronics circuits and/or signal transmission electronics circuits, including assembling of multiple strain gauges with the first substrate, wherein each gauge is associated with a signal processing electronic circuit and/or a signal transmission electronic circuit, and
further comprising individualization of each measuring device by cutting of the first substrate.

13. A method according to claim 10, wherein the layer of material having elastic properties is coated on the first substrate before assembly, and wherein the strain gauge is positioned on this layer.

14. A method according to claim 10, further comprising assembling of the first substrate and a second substrate, wherein one of the substrates includes at least a signal transmission electronic circuit and the other substrate includes a signal processing electronic circuit.

15. A method according to claim 14, further comprising forming pins to connect the two substrates electrically.

16. A method according to claim 10, further comprising forming a chamfer to reconnect electrical connections on the first substrate.

17. A method for deformation measurement including application of a measuring device according to claim 1, wherein the flexible support on which the strain gauge is positioned is attached or glued to the surface having the deformations to be measured, and wherein the elastic layer is positioned between the gauge and the first substrate.

* * * * *